(No Model.)
R. C. SMITH.
ELECTRIC ELEVATOR.
No. 460,541. Patented Sept. 29, 1891.
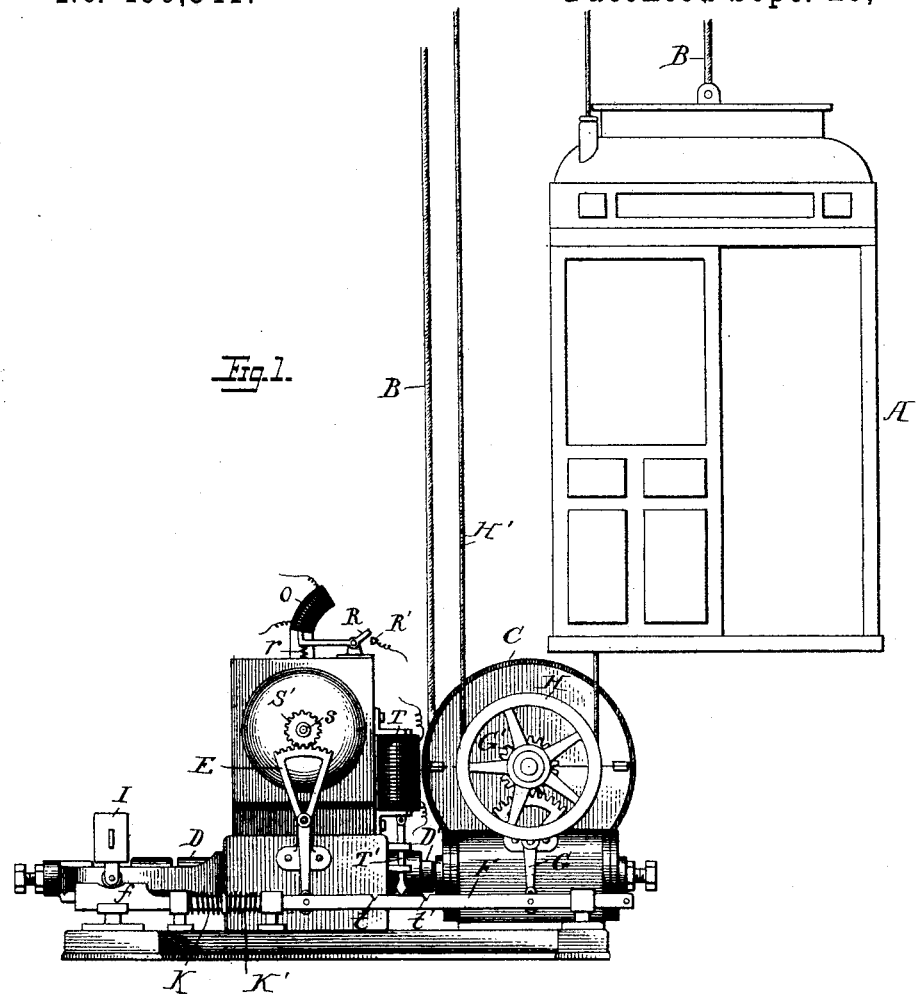
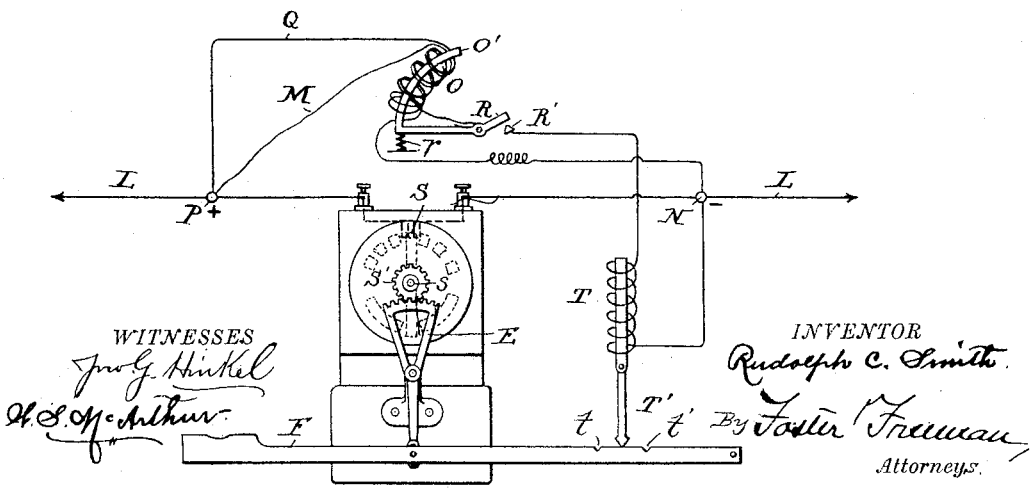
WITNESSES
INVENTOR
Rudolph C. Smith
By Foster Freeman
Attorneys.

UNITED STATES PATENT OFFICE.

RUDOLPH C. SMITH, OF YONKERS, NEW YORK, ASSIGNOR, BY MESNE ASSIGNMENTS, TO THE NATIONAL COMPANY, OF ILLINOIS.

ELECTRIC ELEVATOR.

SPECIFICATION forming part of Letters Patent No. 460,541, dated September 29, 1891.

Application filed December 31, 1890. Serial No. 376,359. (No model.)

*To all whom it may concern:*

Be it known that I, RUDOLPH C. SMITH, a citizen of the United States, residing at Yonkers, Westchester county, New York, have invented certain new and useful Improvements in Elevator-Motors, of which the following is a specification.

In the operation of electric elevators or elevators in which the motive power is derived from a current of electricity energizing an electromotor it is often desirable and sometimes necessary to connect the motor to an existing circuit for the distribution of electricity—such, for instance, as an arc-light circuit—in which the motor for operating the elevator is usually arranged in series circuit with the lamps or other translating devices on the line. When so arranged, it is exceedingly desirable to provide means whereby the motor will interpose only a limited amount of resistance-current both for safety to the motor itself and the appliances connected therewith, and to prevent interference with the lights or other translating devices included in the circuit. To do this some means must be provided whereby the difference of pressure or potential between the points on the line-circuit with which the electromotor is connected can be limited, and when this difference becomes excessive automatic means should be applied, whereby this excessive electro-motive force or difference of potential may be corrected or the motor cut out of circuit. This is especially necessary in the use of electric motors in connection with elevators, for the reason that the parties operating or using elevators are generally not skilled in the application of electricity and are more liable to personal injury, and, further than that, as it is usually not necessary to employ a skilled electrician, some safeguard must be arranged to prevent the motor racing and acquiring too high a speed, and consequently developing too high counter-electro-motive force and absorbing too much of the power of the circuit.

The object of my present invention is to provide such means whereby the motor connected with the elevator will be automatically cut out of circuit or otherwise rendered inoperative in case an excessive counter electromotive force is induced in it; and to these ends my invention consists of a construction and arrangement of parts, such as hereinafter pointed out.

In the accompanying drawings, Figure 1 is a side elevation of an elevator and an electric motor connected to operate the elevator. Fig. 2 is a diagrammatic arrangement of circuits.

In the drawings, the cage A is operated by the suspension-rope B, passing over the drum C in the usual manner, and this drum is operated by an electric motor D, shown as arranged upon the same base as the drum and its driving-gear, which is connected to the shaft D' of the motor. The circuits of the electric motor are controlled by a switch device S, mounted on the shaft $s$ in a manner well known to this class of devices, and by means of which the motor can be started and stopped or reversed by moving the switch over the contacts connected with the terminals of the circuit, and I have shown in the present instance a pinion S', mounted on the shaft $s$, and a sector-lever E, engaging therewith and connected to the moving bar F. Also connected to this bar is another sector-lever G, engaging a pinion G', connected with the wheel H, over which extends the hand-rope H', passing through the car and operated in the usual manner.

I is a brake device bearing on a friction-wheel on the shaft D' of the motor, and this is also operated by means of the shifting-bar F, so that when the motor is stationary the brake is applied; but when the motor is started in either direction the brake device is lifted through the medium of the notch $f$ and the friction-wheel bearing therein.

It will be understood that when the motor is to be started the operator in the car pulls the hand-rope up or down, as the case may be, and the bar F is shifted to the right or left, operating the circuit-controller S to cause the motor to rotate in the proper direction, and this shipper-bar is provided with springs K K', which tend to throw the bar to its normal position with the circuit of the motor cut-out, but which yields under the pressure of the hand of the operator in either direction.

The devices thus far described may be varied, they only being shown as typical and as illustrating a well-known commercial arrangement of electrically-operated elevators.

Referring more particularly to Fig. 2 the arrangement of the circuits will be easily understood, in which it will be seen that the terminals of the electric motor are connected to the line-wire L at the points P and N, there being a short circuit s, having terminals p n, which are closed when the switch is in its normal position shown in the drawings, and the circuit passing through the motor and being therein controlled by the switch device S. Also connected to the terminals P and N is a line M of high resistance, and this line in the present instance is shown as forming one of the coils of the magnet or solenoid O, and it will be understood that the resistance of this circuit is so regulated that under normal conditions light current will pass through the circuit. Also connected to the terminals P and N is a third circuit Q, which includes the second set of coils of the solenoid O and the lever R and contact R', which lever R is connected to the core O of the solenoid, the circuit normally being broken between the contacts R and R'. Also included in the circuit Q is a magnet or solenoid T, the core of which is provided with a detent T', arranged to bear upon the rod F, and when it is moved to operate the motor to engage with one of the notches t t'.

With the parts arranged electrically in the manner shown in this or any equivalent mechanical construction the operation will be readily understood and may be briefly described as follows: In the position shown no current is passing through the motor and the device is stationary, there being a dead-circuit of the motor and switch. When, however, the operator, through the medium of the rope H', moves the bar F in one direction or the other to start the motor, the detent T' engages one of the notches t or t' and serves to hold the bar in the operative position as long as the motor is running normally and the proper amount of current is passing through the same. When, however, from any cause an excessive counter electro-motive force is induced in the motor more current will be forced through the shunt-circuit M of high resistance, and this passing through the coils of the magnet O will energize it sufficiently to attract its core O' and closes the circuit Q of comparatively low resistance at the points R R'. A large quantity of the current will then flow through this circuit Q, and the solenoid T will be energized sufficiently to draw its core, carrying the detent T', upward out of the notch t or t' and release the bar F, which will be immediately restored to its normal condition through the medium of the spring K or K', and thereby move the switch S to cut out the motor, and as soon as this is accomplished the current will flow normally through the line, and the switch R will be operated by a spring r or otherwise to restore the circuits to their proper condition.

While I have shown my invention as applied to one specific means of controlling the motor and circuits, it will be understood that I can utilize substantially the same arrangement to operate or control the motor in different ways, which will suggest themselves to those skilled in the art.

What I claim is—

1. The combination, with the cage of an elevator and an electromotor for operating the same, of a switch controlling the circuits through the electric motor, a shunt of high resistance around the switch, another shunt of lower resistance controlled by the high-resistance shunt, and means controlled by the said low-resistance shunt controlling the operation of the motor, substantially as described.

2. The combination, with the cage of an elevator and an electromotor for operating the cage, of a switch controlling the circuits of the motor, connections with the cage for operating the switch, a high-resistance shunt around the motor, and a normally-open shunt of lower resistance also around the motor, the said low-resistance shunt including a device engaging the switch-operating mechanism of the motor, substantially as described.

3. The combination, with the cage of an elevator and an electromotor and connections for operating the elevator, of a switch controlling the circuits of said motor, a bar connected to be operated with the cage and controlling said switch, a detent engaging said bar and shunt of high resistance around the motor, and a normally-open shunt and a solenoid included therein for operating the detent, substantially as described.

4. The combination, with the cage of an elevator and electromotor and connections for operating the same, of a switch controlling the circuits of the motor, a bar controlled by the operator for moving the switch, a detent for engaging said bar, a circuit of high resistance around the motor, the coils of the switch-magnet included in the said circuit, a normally-open circuit of lower resistance also including the coils of the switch-magnet, and a coil included in said circuit for operating the detent, substantially as described.

5. The combination, with a circuit over which a constant current is sent, of an electromotor included in the circuit and connected to operate an elevator, a shunt of high resistance around the motor, and a normally-open shunt of lower resistance, including a detent-magnet controlling the motor, substantially as described.

In testimony whereof I have signed my name to this specification in the presence of two subscribing witnesses.

RUDOLPH C. SMITH.

Witnesses:
  HENRY L. BRANT,
  SAMUEL BURGER.